United States Patent [19]

Schnell et al.

[11] Patent Number: 4,886,684

[45] Date of Patent: Dec. 12, 1989

[54] PROCESS FOR CONTINUOUS PRODUCTION OF PREPREGS HAVING A HIGH FIBER WEIGHT

[75] Inventors: Peter Schnell, Grieskirchen; Franz Maier-Lehner, Obertrattnach; Rüdiger Spaun, Linz, all of Austria

[73] Assignee: Danutec Werkstoff Gesellschaft m.b.H., Linz, Austria

[21] Appl. No.: 227,538

[22] Filed: Jul. 28, 1988

[30] Foreign Application Priority Data

Aug. 14, 1987 [DE] Fed. Rep. of Germany ....... 3727185

[51] Int. Cl.$^4$ .................................. D02G 3/00
[52] U.S. Cl. .................................. 427/370; 427/374.1; 427/374.4; 427/385.5; 427/386; 427/389.8; 427/389.9; 427/391
[58] Field of Search .................. 427/370, 374.1, 374.4, 427/385.5, 386, 389.8, 389.9, 391

[56] References Cited

U.S. PATENT DOCUMENTS

| Re. 31,670 | 9/1984 | Arco | 427/370 |
|---|---|---|---|
| 3,625,739 | 12/1971 | Kaspar et al. | 427/370 |
| 3,947,615 | 3/1976 | Fry | 427/374.1 |

FOREIGN PATENT DOCUMENTS

| 365617 | 6/1981 | Austria . | |
|---|---|---|---|
| 1629519 | 1/1971 | Fed. Rep. of Germany . | |
| 2856506 | 11/1979 | Fed. Rep. of Germany . | |
| 148628 | 6/1981 | Fed. Rep. of Germany . | |
| 3515483 | 4/1986 | Fed. Rep. of Germany . | |
| 1244984 | 9/1971 | United Kingdom | 427/370 |

OTHER PUBLICATIONS

"GFK im Fahrzeugbau", pp. 37–39 VDI–Gesellschaft Kunstsofftechnik (1978).
Wood, "Modern Plastics International", pp. 86–88, Aug. 1981.

*Primary Examiner*—Stanley S. Silverman
*Attorney, Agent, or Firm*—Wenderoth, Lind & Ponack

[57] ABSTRACT

A process for the production of prepregs having a high fiber weight of 500 to 2500 g/m$^2$, in which process fiber strands made of glass carbon, aramid, ceramic, metal or other inorganic and/or organic fiber materials, if appropriate together with woven fabrics, laid fabrics, nonwoven fabrics or mats made from one of these materials, are impregnated with duroplastic resins without additional solvents and fed to a twin-belt press, in whose first part, the pressure heating zone, the impregnated fiber material is converted into the B state under the action of pressure and heat, and in whose second part, the integral pressure cooling zone, the fiber material is cooled under pressure, thus stabilizing the B state.

6 Claims, No Drawings

PROCESS FOR CONTINUOUS PRODUCTION OF PREPREGS HAVING A HIGH FIBER WEIGHT

The invention relates to a process for continuous production of prepregs having a high fiber weight in a twin-belt press with a pressure heating zone and an integral pressure cooling zone.

From GB No. 1,542,153, it is known to impregnate reinforcement fibers with a thermocurable resin and to leave them in the A state under the action of heat and/or pressure or to convert them, at most, into the B state. However, the prepregs produced in this procedure are thin, having areal weights of only 150 to 250 g/m$^2$. The prepreg production occurs here in two separate steps; in the first, a thin resin film is applied and any solvent present is removed to give a solvent-free dry resin film which can be wound up. In a second step, two resin films of this type, together with a layer of carbon or glass fibers, are passed through the nips of a number of individual heated rolls to form a prepreg. The major disadvantage of this process is that two separate operations are necessary.

However, the customary production of prepregs takes place, without using pressure, in tower-like chambers in which the resin-soaked reinforcement material is fed up and down, most of the solvent present being evaporated by means of warm circulated air, and the resin being converted into the B state (E. W. Laue "Glasfaserverstärkte Polyester und andere Duromere" [Glass fiber-reinforced polyesters and other duromers], 1969, pages 311 to 318. It is usually woven fabrics, and not rovings, which are processed in tower plants of this type since fiber transport is too complicated; each fiber strand must be routed individually, which requires a large number of spools and guide elements. At a customary tower-height of 10 to 20 m, which each fiber strand must pass through upwards and downwards, there is always the danger that of individual roving strands or individual filaments running over one another and the glass distribution in the prepreg consequently no longer being homogeneous. Such large plants are therefore not used for the production of roving prepregs, but instead of woven fabric prepregs, usually using a solvent, which must be worked up separately. If no solvent is used, wetting of the fibers with the resin is more difficult and the impregnation quality decreases. If it is intended to produce relatively thick prepregs having a relatively high fiber content, the impregnation quality likewise decreases with increasing fiber content (Wiedemann et al. in "Plastverarbeiter" [Plastics processor], volume 32 (1981), 4, pages 459–464, paragraph 3.4).

For close fabric types, it has also already been proposed to improve the impregnation quality by passing the fabric, before it reaches the impregnation tower, through a sealed impregnation kettle through which the impregnation solution is pumped under pressure (Laue, page 314).

The object of the present invention was therefore to find a simple process for production of prepregs from rovings or from combinations of rovings with woven fabrics, laid fabrics or non-woven fabrics which makes it possible to produce prepregs having a high fiber weight without using an impregnation tower and without using solvents.

The solution of this object comprises carrying out the fiber impregnation and the conversion of the resin into the B state in a horizontal arrangement in a twinbelt press, the resin of the impregnated fiber material being converted, in a pressure heating zone, into the B state, which is "frozen" in the pressure cooling zone, which is stabilized ("frozen") in the pressure cooling zone, which is an integral part of the twin-belt press.

The present invention accordingly relates to a process for the production of prepregs having a high fiber weight of 500 to 2500 g/m$^2$, wherein fiber strands made of glass, carbon, aramid, ceramic, metal or other inorganic and/or organic fiber materials, if appropriate together with woven fabrics, laid fabrics, nonwoven fabrics or mats made of one of these materials, are impregnated with duro-plastic resins without addition of solvents and fed to a twin-belt press, in whose first part, the pressure heating zone, the impregnated fiber material is converted into the B state under the action of pressure and heat, and in whose second part, the integral pressure cooling zone, the fiber material is cooled under pressure, thus stabilizing the B state.

The process can be carried out using the following fibers: glass fibers made of E or R glass, carbon fibers, aramid fibers, ceramic, metallic or other inorganic and/or organic fibers. The fibers are employed in the form of rovings, 1200 or 2400 tex glass fiber rovings made of E glass being particularly preferred. However, it is also possible to employ woven fabrics, laid fabrics, nonwoven fabrics, stable or unstable mats or decorative papers alongside the rovings. An essential advantage of the invention is the possibility of combining rovings, which provide the component produced from the prepreg with the best mechanical properties in the longitudinal direction, with woven fabrics and the like, which provide the component with additional transverse and torsional strength. It is also possible to employ fiber combinations, so-called fiber hybrids. Moreover, it is possible to produce future decorative effects by adding decorative materials, such as, for example, papers.

The duroplastic resins used are, above all, solvent-free epoxy resin systems which are liquid at room temperature or elevated temperatures and can be converted into the B state by the action of heat. These epoxy resin systems are preferably of the bisphenol A type, optionally with addition of other epoxide group-containing resins and additives, such as, for example, reactive thinners, flexibilizers and the like.

The curing agents used are, for example, aromatic amines, cycloaliphatic amines, amine mixtures, for example of aromatic and cycloaliphatic amines, acid anhydrides, latent curing agents, for example based on imidazoles, or cyanamide, optionally with addition of accelerators, for example benzyldimethylamine.

In order to carry out the process, a resin film is applied to a release film by means of a resin application device, for example a doctor blade. Rovings are introduced into this resin film, optionally together with woven fabrics, laid fabrics, nonwoven fabrics or mats, the fiber materials best being fed in a manner such that wetting takes place from bottom to top on contact with the resin system and the air space between the fiber filaments is thus filled as evenly as possible with the resin. It is advantageous to heat this impregnation zone, thus lowering the viscosity of the resin and improving the fiber wetting. Pre-gelling of the resin/curing agent mixture takes place here. It is also possible to feed additional, pre-impregnated fiber materials to the first fiber layer immediately after impregnation.

In the first part of the twin-belt press, the so-called pressure heating zone, the impregnated fiber material is converted into the B state under the action of pressure and heat. The impregnated and pre-gelled fiber/resin composite is fed into a wedge-shaped nip produced between the upper and lower belts of the twin-belt press, which causes the pressure on the impregnated fiber material to be increased continuously. This prevents the resin, which is initially still of low viscosity, being pressed out. The pressure, temperature and production speed are adjusted depending on the type of the resin and curing agent used. The temperature in the pressure heating zone is about 90° to 160° C., preferably 110° to 150° C. The pressure applied to the impregnated fiber material increases from 0.5 to 3 bar from the beginning to the end of the pressure heating zone.

In the second part of the twin-belt press, the integral pressure cooling zone, the hot prepreg is cooled under pressure, thus stabilizing the B state and preventing transition into the crosslinked C state. Cooling is effected under pressure with the aid of the circulating steel belt of the twin-belt press, which ensures rapid dissipation of heat. The B state of the resin is, as it were, "frozen" and stabilized, and a sheet-like structure is simultaneously shaped and fixed in this state. The pressure in the pressure cooling zone increases up to 1 to 3 bar from the final pressure in the pressure heating zone and is preferably up to 0.5 bar above the final pressure in the pressure heating zone at the end of the pressure cooling zone. Cooling takes place as rapidly as possible to about 50° to 80° C., this temperature being at least 50° C. below the temperature in the pressure heating zone.

By maintaining the pressure in the two zones, good wetting of the individual filaments with the resin/curing agent mixture and a constant prepreg thickness over the entire web width are ensured. In addition, the fibers are fixed transversely to the longitudinal axis due to the constantly maintained pressure and the tendency of the fibers to slip in the transverse direction is prevented.

After leaving the twin-belt press, the prepreg can be wound up in a customary manner on a winder and stored. The production speed is about 1 to 6 m/min, preferably 2 to 4 m/min.

The stability of storage of the prepregs produced in this manner is very good. It meets customary demands and is at least 2 weeks at room temperature, and at least 2 months at −18° C., when customary resin/curing agent systems are used.

The prepregs produced in this manner have a fiber content of 500 to 2500 $g/m^2$, preferably 600 to 1500 $g/m^2$, and can be used, for example, for the production of skis or leaf springs.

EXAMPLE 1:

2400 tex glass rovings (3.6 threads/cm give a glass fiber content of 860 $g/m^2$) are embedded in a resin film comprising 100 parts by weight of bisphenol A epoxy resin and a curing agent mixture comprising 13 parts by weight of isophoronediamine and 9.2 parts by weight of diaminodiphenylmethane, in a twin-belt press at a circulation speed of 3 m/min at a production width of 1000 mm. The glass fibers are impregnated in the impregnation zone at a temperature of 90° C. and then pass to the pressing region of the circulating steel belts, where the prepreg B state is produced at a temperature of 140° C. and a pressure increasing to 1 bar. Cooling is effected to a temperature of 80° C. under a pressure increasing to 1.5 bar in the pressure cooling zone directly following the pressure heating zone.

The prepreg produced in this manner is wound up to form a roll and stored in a refrigerated room until used further. The storage stability is at least two weeks at room temperature and at least 2 months at −18° C.

The prepregs are characterized by a dry, smooth surface and a uniform thickness of 0.90 mm. The prepreg areal weight is 1320 $g/m^2$, the resin content 35% by weight, the resin flow 4% by weight, and volatile components cannot be measured.

EXAMPLE 2:

2400 tex glass rovings (5 threads/cm give a glass fiber content of 1200 $g/m^2$ and a nonwoven polyacrylate fiber fabric (areal weight 25 $g/m^2$) are embedded in a resin film comprising 100 parts by weight of bisphenol A epoxy resin and a curing agent mixture comprising 9.5 parts by weight of cyanamide, 1.0 parts by weight of adipic acid and 1.0 parts by weight of benzyldimethylamine, in a twin-belt press at a circulation speed of 3.5 m/min at a production width of 1000 mm. The impregnation in the impregnation zone takes place at a temperature of 100° C., and the production of the B state is carried out in the pressure heating zone at a temperature of 120° C. and at a pressure increasing to 0.8 bar. Cooling is effected to a temperature of 60° C. under a pressure increasing to 1.3 bar in the pressure cooling zone directly following the pressure heating zone.

The prepregs are characterized by a slightly tacky, smooth surface and a uniform thickness of 1.3 mm. The prepreg areal weight is 1945 $g/m^2$, the resin content 37% by weight, the resin flow 20% by weight, and volatile components cannot be measured.

The prepreg produced in this manner is wound up to form a roll and stored in a refrigerated room until used further. The storage stability is at least 2 weeks at room temperature and at least 2 months at −18° C.

EXAMPLE 3:

2400 tex glass rovings (5.4 threads/cm give a glass fiber content of 1296 $g/m^2$) and a woven mixed carbon/glass glass fiber fabric having an areal weight of 170 $g/m^2$ are embedded in a resin film comprising 100 parts by weight of bisphenol A epoxy resin and 6 parts by weight of the curing agent 2-ethyl-4-methylimidazole, in a twin-belt press at a circulation speed of 3.5 m/min at a production width of 1000 mm. The impregnation in the impregnation zone takes place at a temperature of 110° C., and the production of the B state is carried out in the pressure heating zone at a temperature of 130° C. and a pressure increasing to 1 bar. Cooling is effected to a temperature of 70° C. at a pressure increasing to 1.5 bar in the pressure cooling zone directly following the pressure heating zone.

The prepregs are characterized by a dry, smooth surface and uniform thickness of 1.5 mm. The prepreg areal weight is 2190 $g/m^2$, the resin content 33% by weight, the resin flow 10% by weight and volatile components cannot be measured.

The prepreg produced in this manner is wound up to form a roll and stored in a refrigerated room until used further. The storage stability is at least 2 weeks at room temperature and at least 2 months at −18° C.

What we claim is:

1. A process for the continuous production of prepregs having a high fiber weight of 500 to 2500 $g/m^2$, which comprises:

(a) impregnating strands comprising inorganic and organic materials with a solvent-free epoxy resin system,
(b) feeding said impregnated fiber strands to a twin-belt press having a first part which is a pressure heating zone and a second part which is an integral pressure cooling zone,
(c) converting the impregnated fiber material into the B-state under the action of pressure and heat in said first part, and
(d) cooling the fiber material under pressure in said second part, thus stabilizing the B-state, and wherein the pressure in the pressure heating zone in step (c) is increased from 0 bar of 0.5 to 3 bar from the beginning to the end thereof and is increased from the final pressure in the pressure heating zone up to 1 to 3 bar in the pressure cooling zone from the beginning to the end thereof, the pressure at the end of the pressure cooling zone being up to 0.5 bar above the pressure at the end of the pressure heating zone, and wherein the temperature in the pressure heating zone is 90° to 160° C. and the temperature at the end of the pressure cooling zone is 50° to 80° C., this temperature being at least 50° C. below the temperature in the pressure heating zone.

2. The process as claimed in claim 1, wherein the prepregs have a fiber content of 600 to 1500 g/m$^2$.

3. The process as claimed in claim 1, wherein the fiber strands are made of glass.

4. The process as claimed in claim 1, wherein the temperature in the pressure heating zone is 110° to 150° C.

5. The process according to claim 1, wherein said fiber strands are made of at least one of glass, carbon, aramid, ceramic and metal.

6. The process according to claim 1, wherein said fibers are in the form of woven fabrics, laid fabrics, non-woven fabrics or mats.

* * * * *